United States Patent [19]

Adee et al.

[11] 4,236,585
[45] Dec. 2, 1980

[54] FOLD-BACK IMPLEMENT FRAME HAVING ANGLE ADJUSTMENT

[75] Inventors: Raymond A. Adee, Newton; Ellis E. Adee, Minneapolis, both of Kans.

[73] Assignee: Hesston Corporation, Hesston, Kans.

[21] Appl. No.: 927,957

[22] Filed: Jul. 26, 1978

[30] Foreign Application Priority Data

Apr. 28, 1977 [AU] Australia .............................. 24682/77

[51] Int. Cl.³ ....................... A01B 5/06; A01B 73/00; A01B 21/08
[52] U.S. Cl. .................................... 172/587; 172/311; 280/411 A; 280/656
[58] Field of Search ............... 172/240, 311, 456, 581, 172/584, 587, 662; 280/411 R, 411 A, 411 B, 411 C, 412, 413, 656

[56] References Cited

U.S. PATENT DOCUMENTS

| | | | |
|---|---|---|---|
| 2,113,832 | 4/1938 | Everett | 172/587 X |
| 2,226,586 | 12/1940 | Seaholm | 172/540 |
| 3,327,787 | 6/1967 | Adee | 172/311 |
| 3,491,836 | 1/1970 | Doepker | 172/311 |
| 3,493,247 | 2/1970 | Tasset et al. | 280/411 A |
| 3,548,954 | 12/1970 | Lindemann | 172/311 |
| 3,606,848 | 9/1971 | Dobbs et al. | 172/311 X |
| 3,654,999 | 4/1972 | Fischer | 172/311 |
| 4,066,274 | 1/1978 | Adee | 172/311 X |

FOREIGN PATENT DOCUMENTS

| | | |
|---|---|---|
| 6836 of 1904 | United Kingdom | 172/652 |
| 1294083 10/1972 | United Kingdom | 172/311 |

*Primary Examiner*—Richard T. Stouffer
*Attorney, Agent, or Firm*—Schmidt, Johnson, Hovey & Williams

[57] ABSTRACT

Two tool-carrying beams extending laterally in opposite directions from the tongue of the frame may be swung fore-and-aft between lateral working positions and folded back transport positions. A collapsible link between the tongue and each beam, respectively, may be held partially collapsed against the tongue to maintain its beam in the operating position, or the link may be released for partial extension to permit the beam to swing back into its transport position. Although the innermost tools of the two beams are disposed in close proximity of one another when the beams are in their widespread working positions, the vertical pivots for the beams are so disposed that the beams can swing through arcs exceeding ninety degrees without causing said innermost tools to strike one another.

18 Claims, 5 Drawing Figures

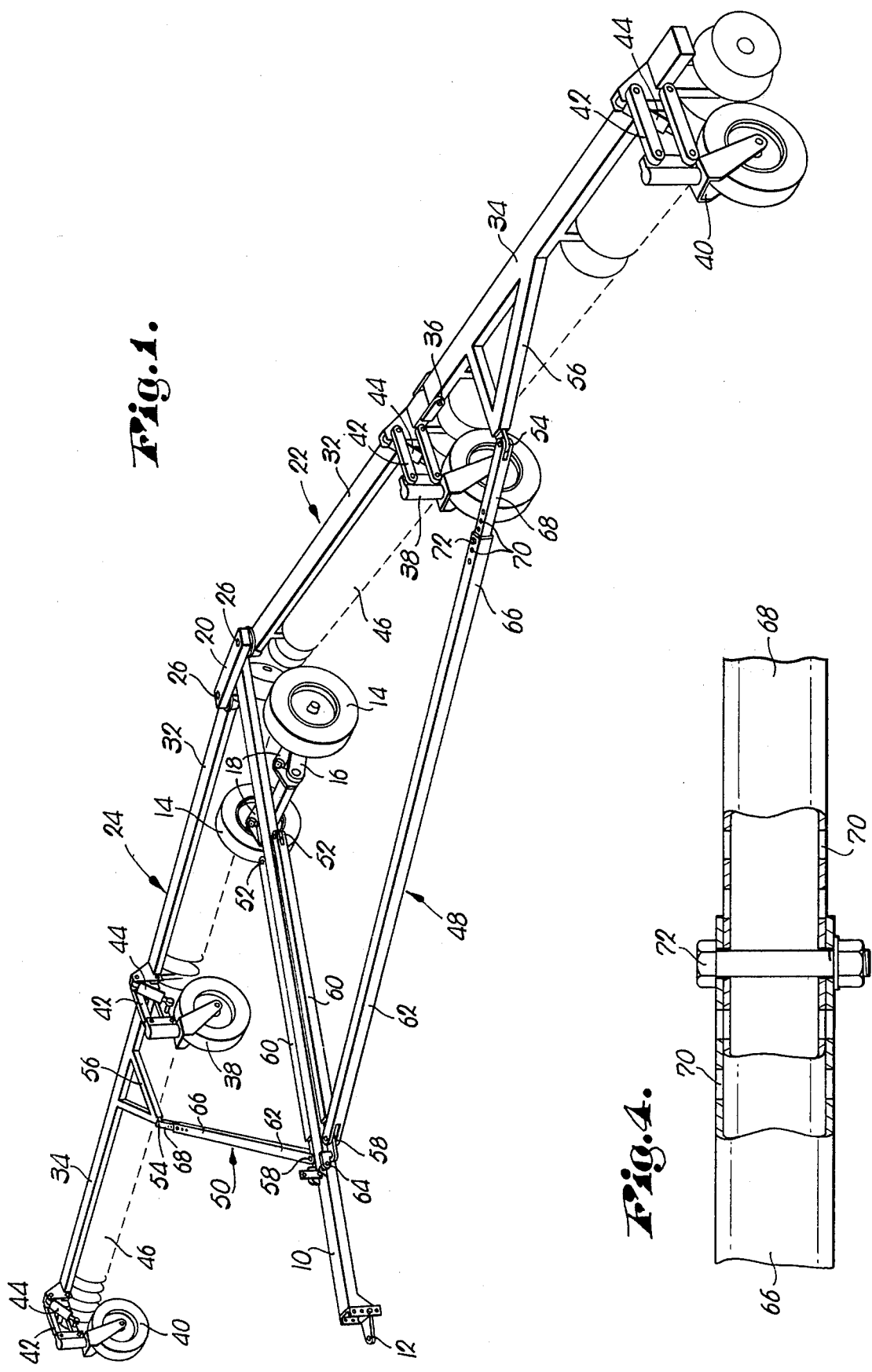
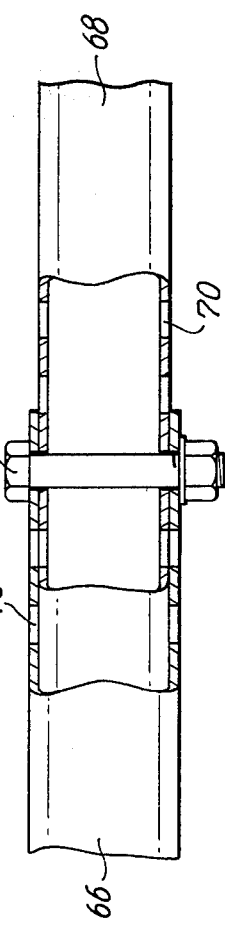

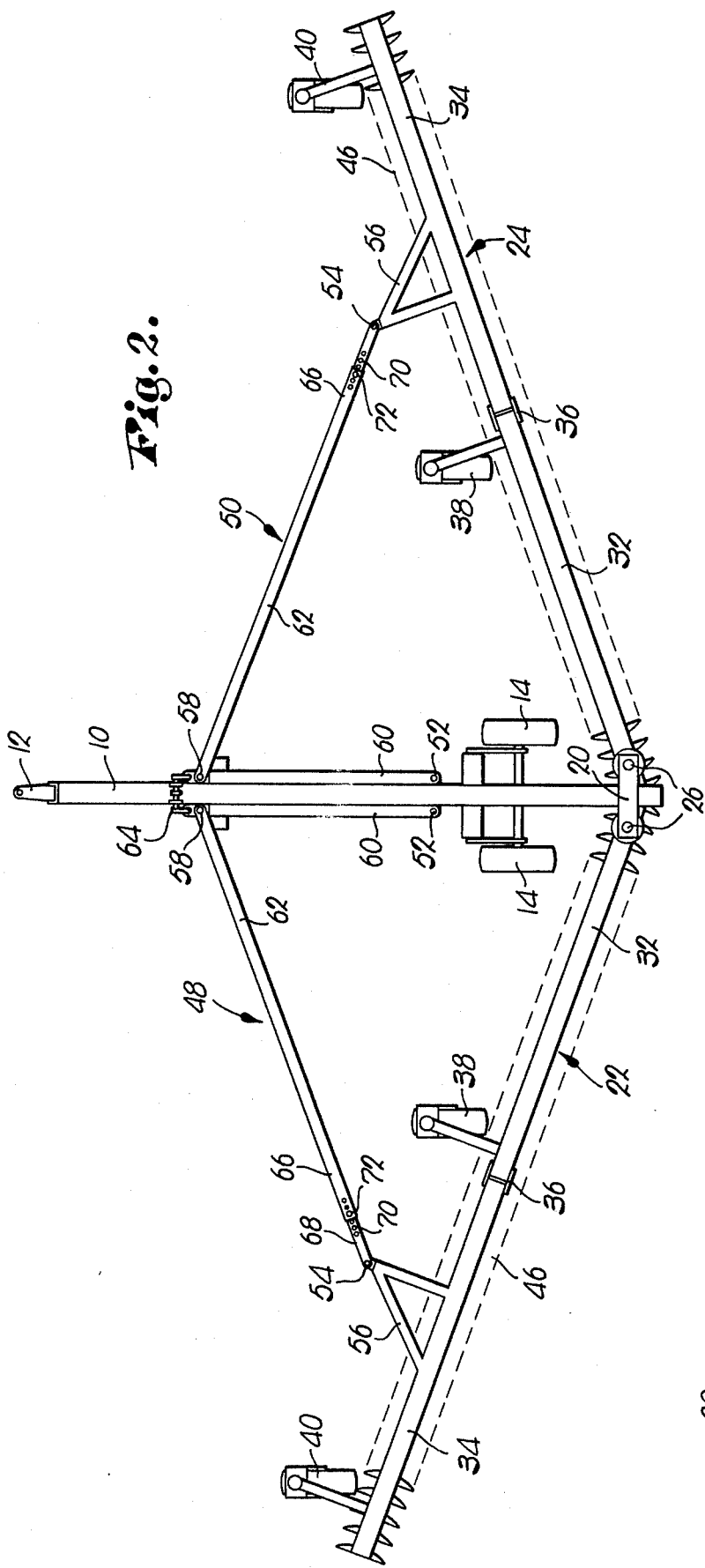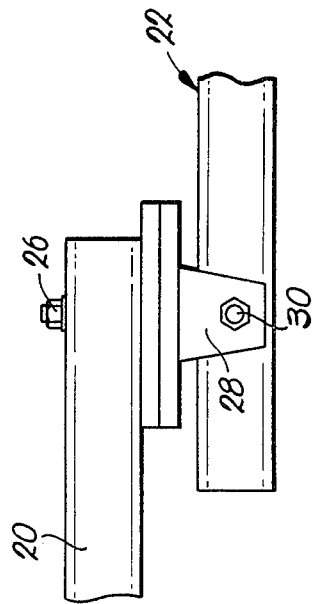

FOLD-BACK IMPLEMENT FRAME HAVING ANGLE ADJUSTMENT

This invention relates to a fold-back implement frame wherein the fore-and-aft swingable, tool-supporting beams of the frame are held in either laterally projecting, operating positions or folded back, transport positions by partially collapsible links on opposite sides of the tongue.

In disc implements especially, it is important to be able to adjust the angle at which the discs engage the soil, but as such machines get larger and larger to meet the demands of the public, it becomes increasingly difficult to arrive at a design which allows the large machines to be folded into a relatively compact unit for transport along roads, through narrow gates and across bridges, while at the same time providing the desired angle adjustment. Accordingly, one important object of the present invention is to provide a frame, suitable for carrying ground-working discs, which cannot only be folded from a widespread, operating condition to a compact, transport condition, but can also provide the necessary and desirable angle adjustment for beams which may carry the discs.

Furthermore, particularly where discs are involved, it is very important that there be no break in the line of soil worked by the discs, and, thus, on prior disc implements wherein two supporting beams for gangs of the discs converge toward a central point of the machine, the two innermost discs of the two separate beams are situated as close to one another as is practically possible. This minimizes the ridge or furrow left between such innermost discs.

However, on prior machines it also means that the beams are very limited, insofar as swingability is concerned, for angle adjustment purposes and for folding purposes to make the machine suitable for transport through gates and along roadways.

Hence, another important aspect of the present invention involves the way in which the tool beams are pivoted to the main tongue so as to permit the two innermost discs of the two opposite extending gangs to be in close proximity to one another for effective ground working purposes and yet not obstruct one another during swinging of the beams through areas that exceed ninety degrees.

In the drawings:

FIG. 1 is a left, front perspective view of a disc implement constructed in accordance with the principles of the present invention, the disc-supporting beams being illustrated in their laterally spread, operating positions;

FIG. 2 is a schematic, top plan view thereof;

FIG. 4 is an enlarged, fragmentary detailed view of one extensible control link, parts being broken away and shown in cross section to reveal details of construction; and FIG. 5 is an enlarged, fragmentary view of the pivotal connection between one of the beams and the central tongue of the frame.

Figure 3:
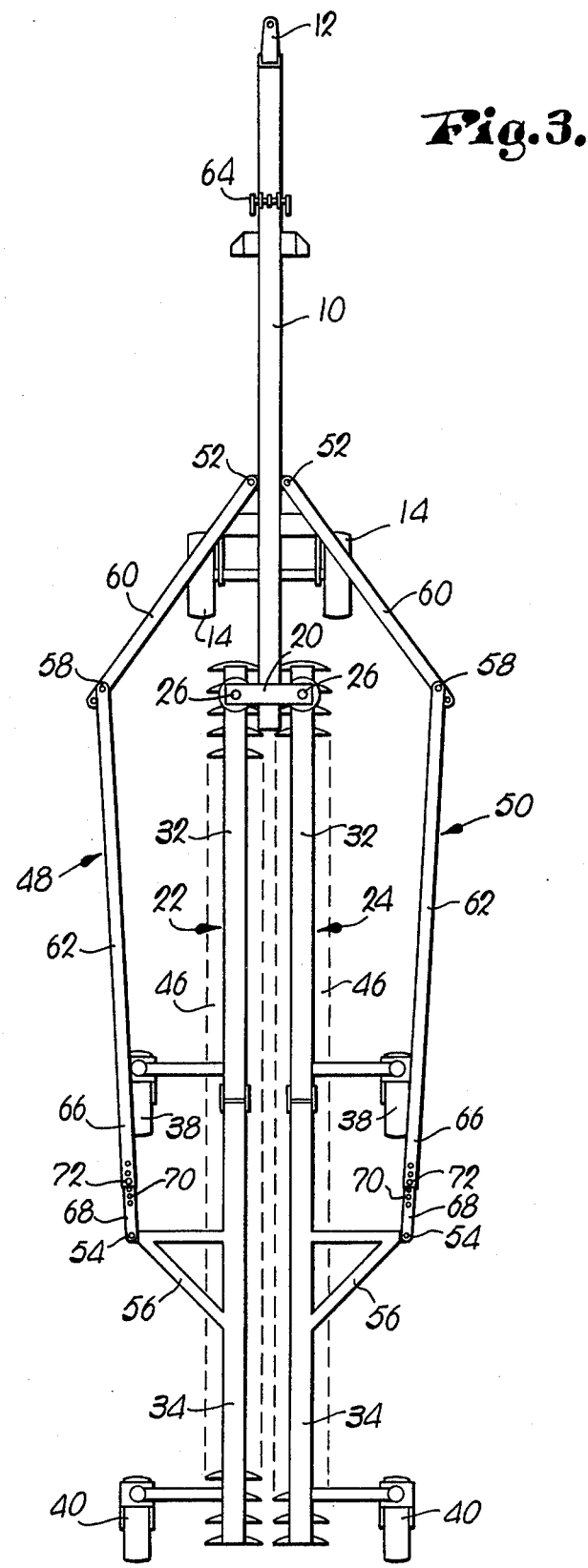
FIG. 3 is a schematic, top plan view similar to FIG. 2 but showing the beams folded back into their transport positions.

The frame has a central, fore-and-aft extending tongue 10 provided with a hitch 12 at its forwardmost end for connecting the implement to a towing vehicle. The tongue 10 is supported somewhat adjacent its rear end for over-the-ground travel by a pair of wheels 14, both of which may be raised and lowered relative to the tongue 10 through a support assembly 16 and hydraulic cylinders 18.

A crosshead 20 at the rear of the tongue 10 supports a pair of laterally outwardly projecting tool beams 22 and 24 in the manner illustrated in FIG. 5. An upright pivot 26 at each end of the crosshead 20 supports a depending bifurcated yoke 28 (FIGS. 1 and 5) for swiveling movement about the axis of pivot 26, each yoke 28 in turn having a horizontal pivot 30 with its corresponding beam 22 and 24. Thus, the beams 22 and 24 are adapted not only for fore-and-aft swinging movement in a horizontal plane about the pivots 26, but also for limited up-and-down swinging movement in a vertical plane, as may be necessary to accommodate changes in ground contour. As illustrated, the two upright pivots 26 are closely spaced on opposite sides of the longitudinal axis of the tongue 10.

Each beam 22, 24, preferably comprises at least two end-to-end connected segments 32 and 34, the connection between segments 32 and 34 being in the nature of a horizontal pivot 36 that enables the segments 32, 34 to relatively flex if differing ground conditions are encountered by the two structures. A castor wheel 38 on the segment 32 adjacent pivot 36 supports the segment 32 for ground travel, while a similar castor wheel 40 carries the segment 34 adjacent its outermost end. Each castor wheel 38, 40 is attached to its respective beam segment 32 or 34 by a parallel bar coupling 42 that is controlled by a hydraulic cylinder 44 so that the wheels 38 and 40 may be raised and lowered relative to the beams 22, 24.

Each beam 22, 24 may carry various kinds of agricultural tools. In the illustrated embodiment, they are provided with depending gangs of ground-working discs 46, all of the discs 46 for each beam 22 and 24, of course, lying in line for rotation about a common axis, although not necessarily a common axle.

As shown in FIGS. 2, 3 and 5, each beam 22, 24 has a portion thereof which extends inwardly beyond the corresponding pivot 26 and supports one or more of the discs. Although this is the preferred arrangement, it is also contemplated that only the lines of discs might extend inwardly beyond the pivots 26 while the beams 22, 24 terminate substantially at the pivots 26. In any event, the innermost discs of the beams 22, 24 are disposed in close proximity to one another when the beams 22, 24 are widespread as shown in FIG. 2, thereby minimizing unworked soil along the center of the machine.

In spite of the closeness of the innermost discs to one another, the beams 22, 24 can be swung through greater than ninety degree arcs as may be seen comparing FIGS. 2 and 3. This is due in part to the strategic location of the pivots 26 relative to the portions of the disc gangs 46 that extend inwardly from pivots 26. First, the distance between the two pivots 26 cannot be less than the combined lengths of the gang portions located inwardly of the pivots 26. Secondly, a spacing must be chosen for the pivots 26 that is not too great, because the greater the spacing, the greater will be the gap between the innermost discs when the beams 22, 24 are angled forwardly in their working positions as shown in FIG. 2. Thus, keeping the spacing as small as possible yet at least as large as the combined lengths of the gang portions located inwardly of the pivots 26 is preferred.

Furthermore, the fact that the beams 22, 24 are symmetrical with respect to their gangs 46 is important. In each case the beam 22 or 24 directly overlies its gangs 46 and the discs extend laterally outwardly therefrom for equal distances in opposite directions. Thus, when the beams 22, 24 swing about pivots 26, there is no greater amount of disc projecting in one lateral direction than the other; each beam 22, 24 can thus swing just as far forwardly from the position in FIG. 2 as it can swing rearwardly (ignoring the control links 48, 50 described below).

The castor wheels 38 and 40 for each beam 22, 24 permit the latter to be alternatively positioned in the laterally widespread operating position of FIG. 2, or the folded back, fore-and-aft extending transport position of FIG. 3. Because of the well-known, free-pivoting nature of castor wheels, the wheels 38 and 40 will automatically seek the proper alignment with the direction of travel regardless of which position the beams 22, 24 occupy.

A pair of articulated control links 48 and 50 for the beams 22 and 24, respectively, each have an inner pivot 52 with the tongue 10 adjacent ground wheels 14 and an outer pivot 54 with the corresponding beam segment 34 outboard of the corresponding upright pivot 26. A generally triangular, forwardly projecting strut 56 on each segment 34 carries the outer pivot 54.

Each link 48, 50 has a joint 58 intermediate its inner and outer ends, thereby presenting an inner link section 60 and an outer link section 62 on opposite sides of the joint 58. This arrangement permits the links 48 and 50 to be partially collapsed, with their inner sections 60 lying against and along the tongue 10, when the beams 22 and 24 are in their operating positions, as illustrated in FIG. 2. On the other hand, the links 48 and 50 may be at least partially extended, almost to a straight line condition, as illustrated in FIG. 3, when the beams 22 and 24 are folded back into their transport positions. During such rearward folding, the inner sections 60 swing through an arc greater than 90° as they swing outwardly from the tongue 10 and then back toward the latter as they thereafter extend rearwardly instead of forwardly. A trigger 64 of any suitable construction may be used to releasably hold the links 48 and 50 in their collapsed conditions against the tongue 10, such trigger 64 being manually actuated such as by a cable (not shown) from the tractor seat.

Each outer section 62 comprises a pair of relatively telescoping lengths 66 and 68, as illustrated in detail in FIG. 4. The lengths 66 and 68 are desirably hollow, and each has a plurality of apertures 70 which may be brought into vertical registration with one another to receive a suitable retainer such as the bolt 72.

In use, the implement may be set in its widespread condition of FIG. 2 or its folded arrangement of FIG. 3 quite easily. When trigger 64 is actuated and the tongue 10 is pulled forwardly by the tractor, the beams 22 and 24 will no longer be retained in their operating positions and, instead, swing back rearwardly as the tongue 10 continues forwardly. Preferably, a bumper of suitable design (not shown) is located at the rear of the tongue 10 slightly beyond the crosshead 20 for the purpose of limiting movement of the beams 22 and 24 toward one another to their folded back positions of FIG. 3. The implement is thereby ready for over-the-road travel through narrow gates and bridges in a safe, compact condition. When it is desired to replace the beams 22 and 24 in their widespread operating positions, it is necessary only to back the tongue 10 in the opposite direction, whereupon the slightly separated beams 22 and 24 will be forced to swing forwardly into their widespread positions as the backing continues. Thereupon, the trigger 64 may once again be used to hold the links in their collapsed conditions against the tongue 10.

If the beams 22 and 24 are not disposed at quite the angle desired by the operator when in their widespread operating positions, he may easily change such angle by first removing the bolts 72 from each outer section 62. This releases the two lengths 66 and 68 of each section 62 so that they may relatively telescope when the operator then slightly backs or pulls forwardly to swing the beams 22 and 24 in the intended direction. As the lengths 66 and 68 relatively extend, the angle between each beam 22 or 24 and the tongue 10 increases. On the other hand, when the lengths 66 and 68 relatively retract, that angle becomes smaller. By bringing selected apertures 70 into vertical registration, the bolt 72 may be replaced to maintain the beams 22 and 24 in the selected angular disposition.

It is to be noted that this manner of adjusting the angle of beams 22 and 24 when the latter are in their operating positions, is relatively uncomplicated, and, yet, it provides a number of significant advantages. For example, even though the machine may be extremely widespread when the beams 22 and 24 are positioned, as illustrated in FIGS. 1 and 2, and must, therefore, be folded in some manner so as to reduce the effective width of the machine for transport, the angle adjustment herein described and claimed in no way interfers with the folding action. In fact, it essentially becomes closely associated with and forms a part of each collapsing control link 48 and 50.

Moreover, note that only a single adjustment structure, i.e., a single bolt 72 and apertures 70 in the telescoping lengths 66 and 68, is necessary for an entire line of disc gangs 46. This is contributed to by virtue of the fact that each inner beam segment 32 is not fixed in a laterally extending position but, instead, swings with its adjacent outer section 34 about the corresponding pivot 26. Hence, in order to adjust angularly an entire line of the discs 46, it is necessary only to make one minor adjustment at the bolt 72 which interconnects the telescoping lengths 66 and 68.

We claim:

1. A horizontally folding implement including:
   - a central, fore-and-aft extending tongue supported for over-the-ground travel in the direction of its longitudinal axis;
   - a pair of vertical pivots associated with said tongue adjacent one end of the latter and on laterally opposite sides of said axis;
   - a pair of beams supported for over-the-ground travel and connected with said tongue by said pivots for horizontal swinging movement between laterally projected working positions and generally fore-and-aft extended transport positions;
   - means for releasably holding said beams in said working positions; and
   - a series of tools carried by each of said beams, respectively,
   - said pivots being connected with their corresponding beams intermediate the opposite ends of the beams so that each beam has a portion thereof extending inwardly beyond the corresponding pivot when the beams are in said working positions,
   - each of said series of tools including one or more tools along said portion of the corresponding beam,
   - said portions of the beams and the tools in said series along said portions being disposed to permit said swinging movement through an arc greater than ninety degrees without interference.

2. A horizontally folding implement as claimed in claim 1, wherein the longitudinal axis of each said series of tools is substantially directly below the corresponding beam.

3. A horizontally folding implement as claimed in claim 1, wherein said portions of the beams extend forwardly from said pivots when the beams are in said transport positions.

4. A horizontally folding implement as claimed in claim 1, wherein said tools of each beam comprise ground-working discs arranged in said series for rotation about a common axis disposed directly below and in parallelism with the longitudinal axis of the beam.

5. A horizontally folding implement as claimed in claim 4, wherein the diameter of said discs is such that the discs project in opposite lateral directions beyond the lateral extremities of their corresponding beams.

6. A horizontally folding implement as claimed in claim 1, wherein said tongue has transverse structure across the same adjacent said one end of the tongue, said pivots projecting downwardly from said structure and connecting the beams to the structure below the latter.

7. A horizontally folding implement as claimed in claim 6, wherein said structure extends across the top of said tongue.

8. A horizontally folding implement as claimed in claim 1; and a pair of horizontal pivots intersecting respective axes of said vertical pivots and adapting the beams for limited vertical swinging movement to accommodate variations in ground contour.

9. A horizontally folding implement including:
a central, fore-and-aft extending tongue supported for over-the-ground travel in the direction of its longitudinal axis;
a pair of vertical pivots associated with said tongue adjacent one end of the latter and on laterally opposite sides of said axis;
a pair of beams supported for over-the-ground travel and connected with said tongue by said pivots for horizontal swinging movement between laterally projected working positions and generally fore-and-aft extended transport positions;
means for releasably holding said beams in said working positions;
a series of tools carried by each of said beams, respectively;
said pivots being connected with their corresponding beams intermediate the opposite ends of the beams so that each beam has a portion thereof extending inwardly beyond the corresponding pivot when the beams are in said working positions,
said portions of the beams and any tools in said series along said portions being disposed to permit said swinging movement through an arc greater than ninety degrees without interference; and
a pair of horizontal pivots intersecting respective axes of said vertical swinging movement to accommodate variations in ground contour,
said tongue having a pair of depending yokes provided with said horizontal pivots, said yokes being rotatable about said axes of the vertical pivots.

10. A horizontally folding implement including:
a central, fore-and-aft extending tongue supported for over-the-ground travel in the direction of its longitudinal axis;
a pair of vertical pivots associated with said tongue adjacent one end of the latter and on laterally opposite sides of said axis;
a pair of beams supported for over-the-ground travel and connected with said tongue by said pivots for horizontal swinging movement between laterally projected working positions and generally fore-and-aft extended transport positions;
means for releasably holding said beams in said working positions; and
a series of tools carried by each of said beams, respectively,
said pivots being connected with their corresponding beams intermediate the opposite ends of the beams so that each beam has a portion thereof extending inwardly beyond the corresponding pivot when the beams are in said working positions,
said portions of the beams and any tools in said series along said portions being disposed to permit said swinging movement through an arc greater than ninety degrees without interference,
said releasable holding means including means for adjusting the angle of said beams in said working positions with respect to said axis of the tongue.

11. A horizontally folding implement as claimed in claim 10, wherein said holding means includes an articulated link between said tongue and each of said beams, respectively, said adjusting means including an extensible section in said link.

12. A horizontally folding implement as claimed in claim 11, wherein said beams are swung rearwardly from the working positions to the transport positions, said links each including an inner section and said extensible section pivotally connected to one another, said inner section lying alongside said tongue and extending forwardly from a rearwardly disposed pivotal connection with the tongue when the beams are in said working positions.

13. A horizontally folding implement including:
a central, fore-and-aft extending tongue supported for over-the-ground travel in the direction of its longitudinal axis;
a pair of vertical pivots associated with said tongue adjacent one end of the latter and on laterally opposite sides of said axis;
a pair of beams supported for over-the-ground travel and connected with said tongue by said pivots for horizontal swinging movement between laterally projected working positions and generally fore-and-aft extended transport positions;
means for releasably holding said beams in said working positions; and
a series of groundworking discs carried by each of said beams, respectively,
said discs of said series on each beam being supported for rotation about a common axis intersecting the axis of the corresponding vertical pivot,
said series of discs for each beam extending inwardly beyond the corresponding vertical pivot when the beams are in said working positions to such a point that the innermost discs of the two beams are in close proximity of one another, yet do not strike one another when said swinging movement of the beams is through an arc greater than ninety degrees.

14. A horizontally folding implement as claimed in claim 13, wherein each of said beams has a portion thereof extending inwardly beyond the corresponding vertical pivot.

15. A horizontally folding implement as claimed in claim 13, wherein the longitudinal axis of each beam intersects said axis of the corresponding vertical pivot.

16. A horizontally folding implement as claimed in claim 13, wherein said tongue has transverse structure across the same adjacent said one end of the tongue, said pivots projecting downwardly from said structure and connecting the beams to the structure below the latter.

17. A horizontally folding implement as claimed in claim 16; and a pair of horizontal pivots intersecting respective axes of said vertical pivots and adapting the beams for limited vertical swinging movement to accommodate variations in ground contour.

18. A horizontally folding implement as claimed in claim 17, wherein said tongue has a pair of depending yokes provided with said horizontal pivots, said yokes being rotatable about said axes of the vertical pivots.

* * * * *